(No Model.)

M. B. ECKERSON.
WHEELED SCRAPER AND GRADER.

No. 307,530. Patented Nov. 4, 1884.

Witnesses.

Inventor:
Matthew Bryant Eckerson

UNITED STATES PATENT OFFICE.

MATTHEW BOGERT ECKERSON, OF HUNTINGTON, NEW YORK.

WHEELED SCRAPER AND GRADER.

SPECIFICATION forming part of Letters Patent No. 307,530, dated November 4, 1884.

Application filed March 4, 1884. (No model.)

*To all whom it may concern:*

Be it known that I, MATTHEW BOGERT ECKERSON, a citizen of the United States, residing at Huntington, in the county of Suffolk and State of New York, have invented certain new and useful Improvements in Wheeled Scrapers and Graders, of which the following is a description in such full, clear, concise, and exact terms as to enable any one skilled in the arts to which my invention belongs or with which it is most nearly connected to make and use the same, reference being had to the accompanying drawings, making part of this specification, and to the letters and figures of reference marked thereon.

Similar letters of reference indicate corresponding parts in all the figures.

Figure 1:
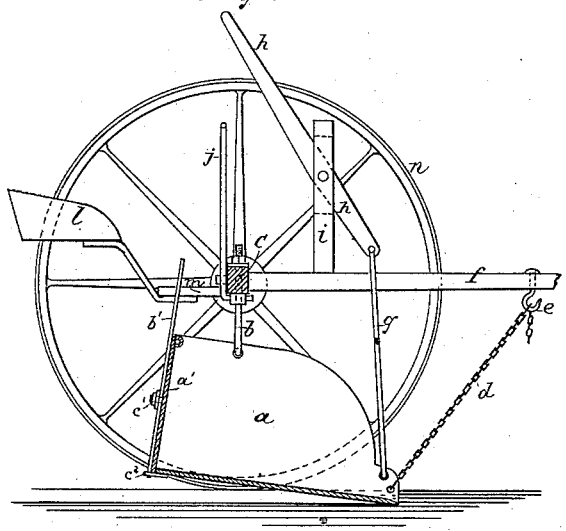
Figure 2:
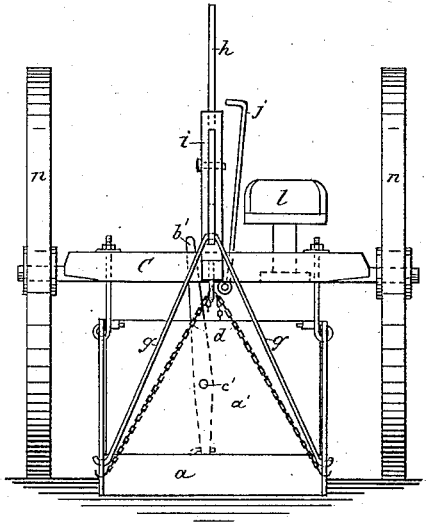
Figure 3:
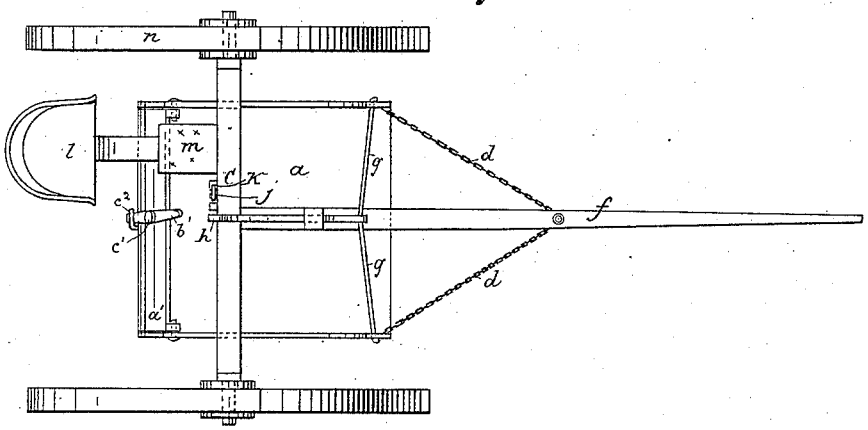

In the said drawings, Figure 1 represents a longitudinal section of my invention; Fig. 2, a front view, and Fig. 3 a plan view, of the same.

$a$ is a scoop, made of iron or other suitable metal or material, and substantially of the form illustrated. This scoop is supported by and hinged upon the rods $b\ b$, attached to the axle or other support, $c$. By means of the nut and screw-thread on the upper end of the rods $b\ b$ the scoop may be raised or lowered. It is supported behind its central or balance line, so that it normally tilts forward to rest upon the ground, as shown. Attached to the forward end of this scoop by eyes or loops at the sides are the chains $d\ d$, caught into the hook $e$ on the pole $f$. The object of these chains is to limit the descent of the forward end of the scoop when in operation, the amount of descent being regulated by adjusting the length of the said chain at the hook $e$. Also, attached by a pivot-joint to the forward end of the scoop is a stiff rod, $g$, which, with the arm $h$, forms a broken lever, $h\ g$, fulcrumed in the standard $i$, supported by the pole or shafts $f$ or the frame of the carriage, as may be most convenient.

A bent rod, $j$, is hinged to a suitable support, and is maintained in a position nearly vertical by the stops $k\ k$, (see Fig. 3,) which limit its lateral play. The whole is supported upon two or more wheels to form a sulky or carriage, and provided also with a seat, $l$, and platform $m$, upon which the person operating the machine may at pleasure sit or stand.

The forward end of the scoop $a$ rests normally in the position illustrated, and when the machine is moved ahead it is drawn into the earth or other material to be removed, as will be readily understood. Should it not, however, promply catch the earth, it may be pressed down by pushing up the handle of the lever-arm $h$. The chain $d$, suitably adjusted, limits the depth to which it can descend.

At the back of the scoop $a$, suspended on hinges at the top, is a tail-board arranged to swing outward. Pivoted on this tail-board is a rod, $b'$, extending some distance above the upper edge of the same, which, being moved to the right or left, locks and unlocks with the hooked projection $c^2$, fastened to the scoop $a$. Any other locking device which can be conveniently operated may be substituted for this contrivance. When the scoop is inclined at the proper angle for dumping, the tail-board, being free, will permit the load to slide out the rear end of the scoop.

The operation of my improved scraper and grader is as follows: When the scoop is filled, the handle $h$ is thrown down and the bent rod $j$ moved to a position where it projects over the top of said arm, in which position it prevents the return of the arm and holds the scoop in a horizontal position while being carried to the dumping-ground, where the load is thrown off by unlatching the tail-board and depressing the handle $h$ still further until the scoop is tilted at such an angle that the material therein slides out at the back.

I do not intend to confine my invention to the precise proportion, arrangement, or combination of parts herein described, and illustrated in the accompanying drawings, as it is evident that various modifications touching the unessential features of my invention may be made without affecting the substantial principle upon which it operates. For instance, if the vehicle be drawn by a single horse instead of a pair of horses, the chains $d\ d$ should be fastened to hooks placed one upon each shaft, and a suitable frame-work built between the axle and shafts to support the stud $i$, in which the lever $h$ is fulcrumed; and if the vehicle have four wheels instead of two, other minor changes will be necessary, which will, however, be readily suggested to the mind of any competent mechanic, and do not in any wise affect the substantial operation of my machine.

Having thus described my invention, I claim, and desire to secure by Letters Patent, the following:

1. In a wheeled scraper, the combination of a pivoted scoop, $a$, adjustable chain $d$, and broken lever $h\ g$, substantially as described.

2. In a wheeled scraper, the combination of a pivoted scoop, $a$, tail-board $a'$, adjustable chain $d$, broken lever $h\ g$, and stop $j$, substantially as described, for the purpose specified.

MATTHEW BOGERT ECKERSON.

Witnesses:
J. EDGAR BULL,
WM. H. BROADNAX.